Patented Apr. 5, 1932

1,852,046

UNITED STATES PATENT OFFICE

HERMANN EICKEN, OF COLOGNE, GERMANY

LIQUID SPRAY FOR PERFUME OR MEDICINAL PURPOSES

Application filed April 21, 1930, Serial No. 445,885, and in Germany March 27, 1930.

The invention relates to that kind of spray or atomizer wherein the atomizing device, consisting preferably of two mutually perpendicular glass nozzles, is fused into the interior of a hollow glass body whose lower portion forms the storage receptacle for the liquid to be atomized, and which is joined at the bottom to a bulb, which being flattened underneath, forms a supporting base for the device. These liquid sprays have the advantage over other types used for the same purpose, especially those where the base is formed on the glass vessel itself, that it is much more handy, but unfortunately, they suffer from the drawback that, owing to the fairly high centre of gravity, which is often unsymmetrical to the centre axis of the base, they easily toss over so that the glass container of the device is in risk of breakage.

According to the present invention, this drawback is avoided by a special shaping of the bulb as well as of the glass vessel containing the spray nozzles, this rendering it possible for the large bottom portion of the vessel to be sunk into the interior of the bulb. By this means not only is the height of the device reduced and therefore the position of the centre of gravity made lower, but the possibility of the glass vessel being knocked is limited to the uppermost portion, so that the risk of breakage is practically eliminated. In order to reduce the risk of breakage, especially when the device is being conveyed in the pocket, there is provided a screwed metal cap which by being attached to the top of the glass vessel, covers up the portion of the latter protruding from the bulb and tightly seals off the fluid space as a protective casing.

A spray device according to the invention is shown in the accompanying drawings.

Figure 1:
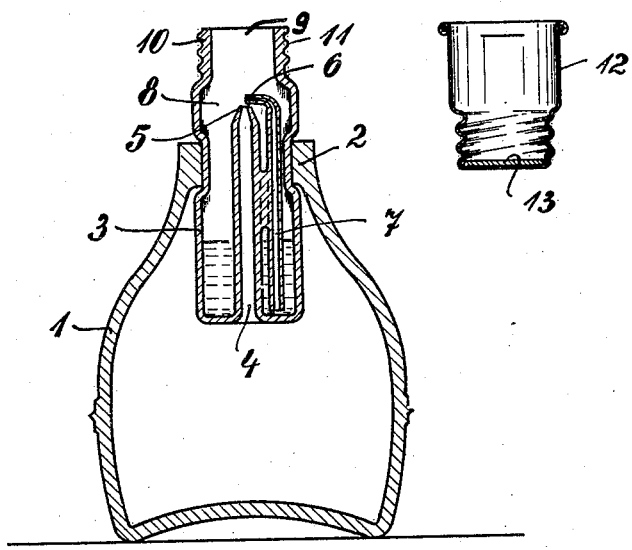

Fig. 1 shows it in vertical section together with the sealing cap belonging to it.

Figure 2:
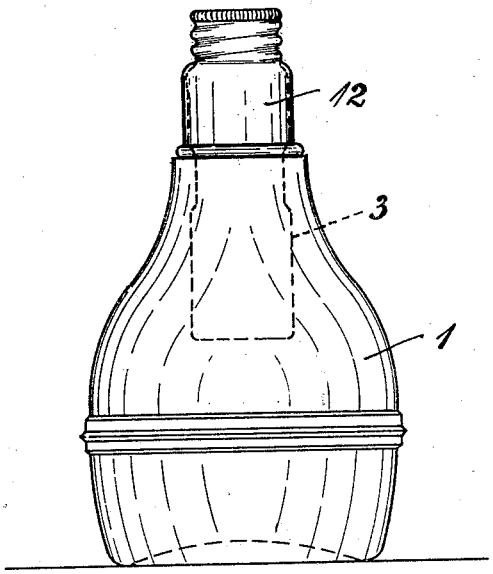

Fig. 2 gives an outside view of the device in the closed condition.

The bulb 1 of the liquid spray is arranged, as in the well known type where it serves as a supporting base, with a flattened or a somewhat inwardly arched base and at the top is provided with a sleeve 2 having a fairly wide aperture and which tightly embraces the middle portion of a substantially cylindrical body 3 at a point which is preferably somewhat reduced. The atomizing device is arranged in the glass body and consists preferably as is often usual in such apparatus, of a vertical blowing nozzle 5 forming the top end of an air tube 4 passing through the bottom of the hollow glass body, and of a horizontal liquid nozzle 6, whose ascension tube 7 joining in a vertical direction, emerges into the hollow vessel close above the bottom.

The spray device consisting of the nozzles 5 and 6 lies preferably in the portion above the reduced place in the hollow vessel 3 gripped by the sleeve 2, that is to say it is visible from outside in a small atomizing chamber 8, adjoining which is a neck 10 provided with a wide aperture 9. This neck is provided outside with a thread 11, on which the upper threaded portion of a metal cap 12 fits. This cap may have its lower enlarged portion screwed down over the portion of the glass vessel 3 protruding from the sleeve 2, until it reaches the end of the sleeve, whilst a packing disc 13 placed under the top portion of the threaded part of this cap serves to seal off tightly the interior space of the glass vessel. The cap in being screwed has its lower end engaging the top of the atomizer bulb to seal or render leakproof the joint between the two.

The fact of the arrangement of the spray nozzles being visible after the removal of the sealing cap, enables the lower liquid chamber to be filled to such a degree that an overflow into the interior of the bulb through the air tube 4 is avoided. In order to obtain the proper measure for the filling of the vessel, the capacity of the screwed cap is preferably made the same as the fluid capacity of the glass vessel, so that it is easily possible to measure out the correct quantity for filling.

As will easily be seen, the portion of the glass container 3 situated at the interior of the bulb, is effectively protected from damage by knocks, yet without the manipulation of the bulb as a blowing device being impaired.

What I claim is:—

1. A device of the kind described comprising a bulb of flexible material having a mouth opening, an atomizer housed in said bulb and having a neck projecting through the mouth opening, and a cap removably secured on the neck and extending downwardly around the neck to bear against the bulb around the mouth opening and thereby hermetically seal the atomizer.

2. A device of the kind described comprising a collapsible bulb of flexible material having a mouth opening, an atomizer housed in said bulb and having a neck projecting through the mouth opening, and a cap removably secured on the neck and extending downwardly around the neck to bear against the bulb around the mouth opening and thereby hermetically seal the atomizer, said atomizer being grooved at the mouth opening to provide a shoulder beneath said mouth opening to prevent upward movement of the atomizer to break the seal.

HERMANN EICKEN.